US011883698B2

(12) United States Patent
Remer

(10) Patent No.: US 11,883,698 B2
(45) Date of Patent: Jan. 30, 2024

(54) AIR-GUIDING COMPONENT

(71) Applicant: Wagner Group GmbH, Langenhagen (DE)

(72) Inventor: Herbert Remer, Kaltenleutgeben (AT)

(73) Assignee: Wagner Group GmbH

(*) Notice: Subject to any disclaimer, the term of this patent is extended or adjusted under 35 U.S.C. 154(b) by 1256 days.

(21) Appl. No.: 16/462,775

(22) PCT Filed: Nov. 17, 2017

(86) PCT No.: PCT/IB2017/001396
§ 371 (c)(1),
(2) Date: Oct. 23, 2019

(87) PCT Pub. No.: WO2018/146508
PCT Pub. Date: Aug. 16, 2018

(65) Prior Publication Data

US 2020/0047011 A1 Feb. 13, 2020

(30) Foreign Application Priority Data

Nov. 25, 2016 (DE) ......................... 102016014058.5
Jun. 20, 2017 (EP) ..................................... 17020264

(51) Int. Cl.
*A62C 3/16* (2006.01)
*B08B 5/02* (2006.01)
(Continued)

(52) U.S. Cl.
CPC .................. *A62C 3/16* (2013.01); *B08B 5/02* (2013.01); *B08B 5/04* (2013.01); *B08B 9/035* (2013.01); *B08B 15/00* (2013.01); *F24F 11/0001* (2013.01)

(58) Field of Classification Search
CPC .. A62C 3/16; B08B 15/00; B08B 5/02; B08B 5/04; B08B 9/035; F24F 11/0001;
(Continued)

(56) References Cited

U.S. PATENT DOCUMENTS 5,853,438 A * 12/1998 Igarashi ................ F01N 3/0233 60/296
10,888,812 B2 * 1/2021 Han .......................... F01N 3/02
2012/0247073 A1 * 10/2012 Louis-Rose ............ B01D 46/48 55/304

FOREIGN PATENT DOCUMENTS

DE 202007006769 U1 9/2008
DE 202009018710 U1 10/2012
(Continued)

OTHER PUBLICATIONS

Air Sampling Smoke Detection System Titanus Top Sens, date: 2019.

*Primary Examiner* — Douglas Lee
(74) *Attorney, Agent, or Firm* — Frank H. Foster; Kremblas & Foster

(57) ABSTRACT

The invention relates to an air-guiding component (1) for a pipe system, in particular for a pipe system for gaseous media preferably used in an aspirating fire detection and/or air-monitoring system. The air-guiding component (1) comprises a housing (7) having a gas inlet (12*a*) and a gas outlet (12*b*), wherein the gas inlet (12*a*) and the gas outlet (12*b*) are fluidically connected or connectable to the pipe system in order to form a flow path from the gas inlet (12*a*) to the gas outlet (12*b*) in the interior of the housing. A connection region with a port (6) is also provided for fluidically connecting, as needed or optionally, the housing interior to a maintenance/cleaning device.

7 Claims, 10 Drawing Sheets

(51) Int. Cl.

| | |
|---|---|
| ***B08B 5/04*** | (2006.01) |
| ***B08B 15/00*** | (2006.01) |
| ***F24F 11/00*** | (2018.01) |
| *B08B 9/035* | (2006.01) |

(58) Field of Classification Search
CPC .... F24F 13/28; G08B 17/113; F24C 15/2035; F23J 15/025; B01D 46/66; B01D 46/0005; B01D 46/71; F01N 3/0233
See application file for complete search history.

(56) References Cited

FOREIGN PATENT DOCUMENTS

| | | | |
|---|---|---|---|
| DE | 102014011444 | A1 | 3/2015 |
| EP | 0025628 | A2 | 3/1981 |
| EP | 0341451 | A1 | 11/1989 |
| EP | 2871620 | A1 | 5/2015 |

* cited by examiner

AIR-GUIDING COMPONENT

BACKGROUND OF THE INVENTION

The present invention relates to a filter component for a pipe system for an intake pipe system for gaseous media used in an aspirating fire-detection and/or air-monitoring system.

Aspirating fire-detection and/or air-monitoring systems are generally known from fire protection technology and are used, for example, for detecting incipient fires, for monitoring the air quality, or for monitoring the air composition, for example, the oxygen content, in an enclosed space. Such aspirating fire-detection and/or air-monitoring systems generally have at least one detection unit and/or at least sensor for detecting a fire characteristic variable and/or for monitoring at least one parameter characterizing the air quality or air composition and also a pipe system used as a supply line, via which ambient air samples can be supplied to the at least one detection unit.

Aspirating fire-detection and/or air-monitoring systems of this type are frequently used for very early detection of fires already in the incipient phase thereof. They are then also called, for example, smoke aspirating systems, aspirating smoke detectors, or active detectors. Typical areas of application are either rooms having high value or important devices, for example, rooms having EDP systems in banks, in insurance companies, or in computer centers, or the EDP systems themselves. For this purpose, representative partial quantities are continuously taken from the room air or the device cooling air and supplied via at least one pipe system, which is used as a supply line, of the detection unit of the aspirating fire-detection and/or air-monitoring system to detect a fire characteristic variable. The required partial vacuum for air sample taking is generally produced via an aspirating unit, for example, a fan.

The term "pipe system" used herein is to be understood to mean preferably but not exclusively pipelines designed as supply lines, which are fastened below the room ceiling for room protection and lead to an air entry opening into the housing of the detector associated with the aspirating fire-detection and/or air-monitoring system, and which aspirates the room or device cooling air in through intake openings, which are provided in the pipe system. In aspirating fire-detection and/or air-monitoring systems, which are provided for room protection, and in which the pipe system used as the supply line consists of one or more pipelines, the intake openings in the pipelines are preferably arranged at regular intervals. The pipes can be made of metal or plastic, for example. The pipe systems do not necessarily have to comprise rigid pipes, but rather can also be at least partially formed from hosepipes.

The term "fire characteristic variable" is understood to mean physical variables which are subject to measurable changes in the surroundings of an incipient fire. Examples of this are the ambient temperature, solid, liquid, or gas proportions in the ambient air (formation of smoke particles, gases, or aerosols), or the ambient radiation. Smoke particles can be detected, for example, using scattered light or transmitted light sensors and smoke gases can be detected using chemical sensors.

"Air monitoring" can be understood, for example, as monitoring of the air quality or the air composition. The oxygen content of the air in the monitored room can thus be analyzed using chemical sensors, for example. This monitoring is relevant in particular in conjunction with fire-prevention and firefighting systems, which proactively reduce the risk of a fire or reactively extinguish an incipient fire, for example, by introducing inert gas or nitrogen-enriched air, wherein the oxygen content in the protected region has to be continuously monitored for the safety of persons present and to regulate the supplied gas flow.

An aspirating fire-detection and/or air-monitoring system is extremely dependent on maintaining the airflow, which is generated by an aspirating unit, for example, a fan, as an aspirating force. An airflow sensor permanently monitors the pipe system for fractures and clogging. To ensure the maintenance of this airflow, regular cleaning and/or maintenance of the pipe system is also required to prevent variations of the airflow to be supplied to the detection unit of the aspirating fire-detection and/or air-monitoring system and in particular a creeping decrease of the airflow because of soiling, moisture, etc. In practice, such cleaning is usually carried out by blowing out the pipes, i.e., a compressed air source is connected to the pipe system and one or more pressure pulses expel the dirt and water particles out of the pipe system. The connection between the pipe system and the detection unit has to be blocked beforehand, because the mechanically sensitive detection unit could be damaged by the pressure pulse.

The typical blowing-out devices according to the prior art have the disadvantage of the increased installation expenditure, for example, due to the installation of a blowing-out valve or due to the installation of three-way ball valves to shut off the connection to the detection unit, and the costs linked thereto.

EP 0 476 546 A1 relates to a three-way valve in the form of a hand-operated valve. The three-way valve may commonly being used in existing pipeline systems and comprises a valve body. Three ports designed as inlets and outlets, namely A, B and C are provided on the valve body, as well as a cavity K which is fluidically connected to the ports. The valve core is provided with a L-shaped passage and rotatably supported by its top and bottom journals and bearing provided in bores in the valve cover plate and the valve body. A cylindrical filter element is fitted into one leg of the L-shaped passage. Turning a handle can effect the valve to be in four modes of flow schemes. During a filtration flow, wherein the medium flows from A to B, debris will be retained on the inner surface of the filter element. For flushin off the debris, the filter element can be reverse-flushed in a by-pass flow mode from A to C.

GB 16460 A further relates to a combined filter and plug cock. The cock comprises a rotatable hollow plug furnished with three apertures g, h and j; the plug co-operating with a body containing three ports b, c and d. In one position a flow may be arranged to take place from the port g to the port h passing through a filter element for filtering material from the liquid. Any material filtered from the liquid will then collect within the space m. This material will be washed out when the plug is in another position and the flow takes place between the port h and the port j. Suitable packing means such as a gland may be provided.

The object of the invention is therefore the simplification of the maintenance of the pipe system, and the reduction of the components required for this purpose and the costs linked thereto.

The object on which the present invention is based is achieved according to the invention in particular by the subject matter of independent claims 1 and 10 or by a method for maintaining and/or cleaning a pipe system according to concurrent claim 11, respectively.

SUMMARY OF THE INVENTION

Accordingly, in particular an air-guiding component is proposed for a pipe system, in particular for an intake or exhaust pipe system for gaseous media preferably used in an aspirating fire-detection and/or air-monitoring system, wherein this air-guiding component has a housing having a gas inlet and a gas outlet. The gas inlet and the gas outlet of the housing are fluidically connected or connectable to the pipe system to form a flow path extending from the gas inlet to the gas outlet in the interior of the housing. According to the invention, the air-guiding component furthermore has a connecting region to fluidically connect the housing interior to a maintenance/cleaning device if needed or optionally. The fluidic connection of the housing interior to a maintenance/cleaning device comprises in particular the connection of an auxiliary pipe system or hose system associated with a maintenance/cleaning device or a similar line to the maintenance/cleaning device.

The maintenance/cleaning device comprises, for example, a partial vacuum source or overpressure source for cleaning the pipe system. A compressed air container comes into consideration as an overpressure source, for example, in the simplest variant a vacuum cleaner or, for example, a vacuum pump can be provided as the partial vacuum source. Particularly simple and effective cleaning of the pipe system can be carried out using a vacuum cleaner, moreover detached dirt particles are collected in a vacuum cleaner container and are not discharged into the surroundings through openings of the pipe system during blowing out.

The application of the maintenance/cleaning device is not restricted to cleaning. For example, the maintenance device can also comprise a test gas source for introducing a test gas for testing the function of the pipe and/or intake system or the detection unit.

The term "air-guiding component" used herein is generally to be understood as a component which has an airflow aspirated via the pipe system flowing through it at least in regions in a normal operating mode of the air-guiding component and/or the fire-detection and/or air-monitoring system. A filter component comes into consideration as the air-guiding component in the meaning of the present invention. It is essential for this purpose that the air-guiding component has a housing having a gas inlet and a gas outlet, wherein the gas inlet and the gas outlet of the housing are fluidically connected or connectable to the pipe system in the normal operating mode of the air-guiding component and/or the fire-detection and/or air-monitoring system to form a flow path extending from the gas inlet to the gas outlet in the housing interior.

The air-guiding component according to the invention furthermore has a connecting region, via which the housing interior is fluidically connectable to a maintenance or cleaning device if needed or optionally.

It is conceivable in this context, for example, in a maintenance/cleaning operating mode of the air-guiding component and/or the fire-detection and/or air-monitoring system, to fluidically connect it via the connecting region of the air-guiding component to the maintenance/cleaning device, so that then, for example, cleaning compressed air can be supplied via the connecting region to the pipe system. Alternatively or additionally, however, it is also conceivable, in a maintenance/cleaning operating mode of the air-guiding component and/or the fire-detection and/or air-monitoring system, to connect a maintenance/cleaning device to the connecting region, wherein air and also possible liquid and solid particles can be suctioned out of the pipe system via a partial vacuum or vacuum source.

The advantage which results with the air-guiding component according to the invention is obvious: by using an air-guiding component already provided in the pipe system for the purpose of maintenance and/or cleaning in order to supply cleaning compressed air to the pipe system and/or suction air out of the pipe system, it is no longer necessary for the purposes of maintenance and/or cleaning to provide an additional interface, for example, via a three-way ball valve, in the pipe system.

In other words, the air-guiding component receives a double function according to the invention: in the normal operating mode of the air-guiding component and/or the fire-detection and/or air-monitoring system, the air-guiding component assumes its typical function, for example, the filtration of the gas flow aspirated and/or suctioned via the pipe system, while in a maintenance/cleaning operating mode of the air-guiding component and/or the fire-detection and/or air-monitoring system, the air-guiding component forms the interface to the maintenance/cleaning device.

According to the present invention, the connecting region has a fitting provided in or on a wall region of the housing of the air-guiding component, via which the housing interior is fluidically connectable to the maintenance/cleaning device (in a maintenance/cleaning operating mode of the air-guiding component and/or the fire-detection and/or air-monitoring system) if needed or optionally. It is conceivable in this context, for example, if the wall region in or on which the fitting is provided is embodied as an integral component of the housing of the air-guiding component and is fixedly connected thereto.

The fitting can be, for example, a threaded fitting, which is closed using a closure cap when no maintenance/cleaning device is connected. The fitting can also be, for example, a conical quick-action coupling fitting having a shutoff slide for optionally opening, reducing, and closing the connection to the housing interior of the air-guiding component. Using a quick-action coupling, the connection to the maintenance/cleaning device can be established rapidly, so that the maintenance work is accelerated.

According to the invention, it is also conceivable if the wall region, in or on which the fitting is provided, is embodied as a wall region of a first component detachably connected or connectable in particular via a quick-action closure to the housing, wherein the wall region of this first component is designed to close a housing opening provided in the housing. This housing opening is, for example, a closable service opening or similar opening, via which at least partial access into the housing interior can be provided if needed.

In one conceivable refinement of the last-mentioned embodiment, in which the wall region, in or on which the fitting is provided, is embodied as a wall region of a first component detachably connected or connectable to the housing, it is provided that this first component detachably connected or connectable to the housing is replaceable with a second component, which has a wall region without fitting and is also detachably connected to the housing if needed. This second component is preferably designed in such a way that in a state in which the second component is connected to the housing, it closes the housing opening (for example, service opening) provided in the housing. It suggests itself in this case that the second component—with the exception of the fitting provided in the first component—be embodied at least substantially identically to the first component. This would have the advantage that the second component and/or the wall region of the second component can be connected via the same fastening means, using which the wall region of the first component is detachably connectable to the housing of the air-guiding component. A quick-action closure suggests itself in this case as the connecting means. In other words, the first component can be imagined, for example, as a housing cover having a fitting opening or a fitting, for example, a pipe or hose fitting, and the second component as a continuously closed housing cover without such a fitting opening or such a fitting.

According to embodiments of the present invention, in which the connecting region of the air-guiding component has a fitting provided in or on a wall region of the housing of the air-guiding component, via which the housing interior is fluidically connectable to the maintenance/cleaning device if needed or optionally, it is provided that a closure part is associated with the fitting, to reduce an effective flow cross section of a fluidic connection implementable via the fitting between the housing interior and the maintenance/cleaning device if needed/optionally or to disconnect a fluidic connection implementable via the fitting between the housing interior and the maintenance/cleaning device if needed or optionally.

It is conceivable in this context, for example, if the fitting of the connecting region of the air-guiding component is embodied as a fitting nozzle or the like, wherein the closure part which is associated with the fitting is designed as a valve or a protective cap. Of course, other embodiments also come into consideration here for the fitting and/or the closure part associated with the fitting.

According to the present invention, at least one shutoff element is associated with the gas inlet of the housing of the air-guiding component, to reduce an effective flow cross section of a fluidic connection implementable via the gas inlet between the pipe system and the housing interior if needed or optionally, or to disconnect a fluidic connection implementable via the gas inlet between the pipe system and the housing interior if needed or optionally. Alternatively or additionally thereto, it is conceivable if at least one shutoff element is associated with the gas outlet of the housing of the air-guiding component to reduce an effective flow cross section of a fluidic connection implementable via the gas outlet between the housing interior and the pipe system if needed or optionally or to disconnect a fluidic connection implementable via the gas outlet between the housing interior and the pipe system if needed or optionally.

Due to the provision of at least one shutoff element, which is associated with the gas inlet and/or the gas outlet of the housing of the air-guiding component, it is possible in a manner which is simple to implement but nonetheless effective, in a maintenance/cleaning operating mode of the air-guiding component and/or the fire-detection and/or air-monitoring system, to fluidically disconnect partial regions of the pipe system from the housing interior of the air-guiding component and thus the maintenance/cleaning device, which is required and necessary, for example, if sensitive components provided in the pipe system and/or fluidically connected to the pipe system, such as sensors, detectors, or also other components, are not to have pressure pulses applied thereto and/or be subjected to partial vacuum in the maintenance/cleaning operating mode of the air-guiding component and/or the fire-detection and/or air-monitoring system. In other cases, for example, during the testing of the function of sensors or detectors using a test gas, another part of the pipe system, which is not connected to the sensors or detectors, can be blocked. In the case of complete disconnection of the connections between the air-guiding component and the pipe system, for example, only a filter contained in the air-guiding component can be cleaned, for example, suctioned out.

According to conceivable implementations of the last-mentioned embodiments, in which at least one shutoff element is associated with the gas inlet and/or gas outlet of the housing of the air-guiding component, it is provided that the housing of the air-guiding component has at least one opening associated with the at least one shutoff element, via which the at least one shutoff element is insertable at least in regions to reduce an effective flow cross section of a fluidic connection implementable via the gas outlet or the gas inlet, respectively, of the housing of the air-guiding component between the housing interior and the pipe system if needed or optionally. Alternatively thereto, however, it is also conceivable if the at least one shutoff element is insertable via the at least one opening associated with the shutoff element to disconnect a fluidic connection implementable via the gas outlet or the gas inlet, respectively, of the housing of the air-guiding component between the housing interior and the pipe system if needed or optionally. The openings associated with at least one shutoff element can be closable, for example, using sealing lips or a displaceable cover. Of course, however, other embodiments of shutoff elements come into consideration for reducing the effective flow cross section of the fluidic connection implementable via the gas outlet or the gas inlet, respectively, or for disconnecting the fluidic connection implementable via the gas outlet or the gas inlet, respectively.

According to embodiments of the air-guiding component according to the invention, the housing thereof is designed to accommodate, preferably in a replaceable manner, at least one filter element in its housing interior. In particular, the at least one filter element can be accommodated in the housing interior in such a way that in a normal operating mode of the air-guiding component and/or the fire-detection and/or air-monitoring system, the flow path extending from the gas inlet of the air-guiding component to the gas outlet of the air-guiding component extends at least partially through the at least one filter element accommodated in the housing interior. In other words, in these embodiments of the air-guiding component according to the invention, the air-guiding component has the function of an air filter in the normal operating mode of the air-guiding component and/or the pipe system.

If, in contrast, in a maintenance/cleaning operating mode of the air-guiding component and/or the pipe system, the pipe system fluidically connected or connectable to the gas inlet and/or the gas outlet of the air-guiding component is to be cleaned and/or maintained, the at least one filter element can optionally be removed from the housing interior. In this manner, the air resistance of the housing interior of the air-guiding component can be reduced in the maintenance/cleaning operating mode.

In this context, it is conceivable if at the same time an effective flow cross section of a fluidic connection implementable via the gas outlet of the air-guiding component is reduced or a fluidic connection implementable via the gas outlet of the air-guiding component is disconnected in the maintenance/cleaning operating mode of the air-guiding component. Alternatively thereto, it is similarly conceivable that an effective flow cross section of a fluidic connection implementable via the gas inlet of the air-guiding component is reduced or a fluidic connection implementable via the gas inlet is disconnected at the same time in the maintenance/cleaning operating mode of the air-guiding component.

According to embodiments of the air-guiding component of the present invention, in its normal operating mode, it has the function of a distributor pipe or manifold pipe, wherein the housing of the air-guiding component is embodied as a distributor pipe or manifold pipe housing. In such embodiments, multiple gas inlets and/or gas outlets can also be provided, which can accordingly be entirely or partially closed using one or more shutoff elements if needed or optionally. In the normal operating mode of the air-guiding component, the flow path extending from the at least one gas inlet of the air-guiding component to the at least one gas outlet of the air-guiding component runs at least partially through the housing interior of the air-guiding component.

In a maintenance/cleaning operating mode of the air-guiding component and/or the pipe system, in contrast, i.e., in an operating mode in which the pipe system fluidically connected or connectable to the at least one gas inlet and/or the at least one gas outlet of the air-guiding component and/or the air-guiding component is to be cleaned and/or maintained, the housing interior is fluidically connected or connectable to the maintenance/cleaning device.

In this context, it is conceivable if simultaneously thereto an effective flow cross section of a fluidic connection implementable via the at least one gas outlet of the air-guiding component is reduced or a fluidic connection implementable via the gas outlet of the air-guiding component is disconnected. Alternatively thereto, it is conceivable that at the same time an effective flow cross section of a fluidic connection implementable via the gas outlet is reduced or a fluidic connection implementable via the gas inlet is disconnected.

The invention does not merely relate to an air-guiding component according to the above described aspects, but rather also a pipe system, in particular of an aspirating fire-detection and/or air-monitoring system, wherein at least one air-guiding component of the type according to the invention is associated with this pipe system.

According to further aspects there is furthermore a kit for cleaning and/or maintaining a pipe system, in particular for cleaning and/or maintaining an intake pipe system for gaseous media preferably used in an aspirating fire-detection and/or air-monitoring system. For this purpose, the kit has an adapter part for an air-guiding component and also a maintenance/cleaning device. The air-guiding component has a housing having a gas inlet and a gas outlet, wherein in a normal operating mode of the air-guiding component, the gas inlet and the gas outlet are fluidically connected or connectable to the pipe system to form a flow path extending in the housing interior from the gas inlet to the gas outlet.

The housing of the air-guiding component has at least one wall region, which is embodied as a second component detachably connected or connectable to the housing of the air-guiding component, in particular via a quick-action closure. The wall region is designed to close a housing opening provided in the housing in the normal operating mode of the air-guiding component, wherein the housing opening provided in the housing is in particular a closable service opening, via which at least partial access into the housing interior of the air-guiding component is allowable if needed. The first and second components are each embodied, for example, as a housing cover.

The adapter part associated with the kit is preferably embodied as a first component and is designed to cover and in particular to close the housing opening instead of the second component if needed or optionally. The adapter part embodied as the first component preferably has a fitting, via which the housing interior of the air-guiding component is fluidically connected or connectable to a maintenance/cleaning device if needed or optionally if, instead of the second component, the adapter part embodied as the first component covers and in particular closes the housing opening of the air-guiding component.

It is provided in particular in the kit that the second component and/or the adapter part embodied as the first component is/are preferably detachably connected or connectable to the housing of the air-guiding component, in particular with the aid of a quick-action closure device. In one embodiment, the adapter part has one or two spring clips as a quick-action closure, which are clamped around another housing section of the air-guiding component, for example, around the fittings to the adjoining pipes and thus produce a detachable clamp connection between the housing cover and the housing of the air-guiding component. A particularly simple and rapid fastening is implemented in this way.

In embodiments of the kit, it is provided that a closure part is associated with the fitting, to reduce an effective flow cross section of a fluidic connection implementable via the fitting between the housing interior of the air-guiding component and the maintenance/cleaning device if needed or optionally, or to disconnect a fluidic connection implementable via the fitting between the housing interior of the air-guiding component and the maintenance/cleaning device if needed or optionally if, instead of the second component embodied as a housing cover, the adapter part embodied as the first component covers and in particular closes the housing opening of the air-guiding component.

Alternatively or additionally thereto, it is conceivable if the adapter part embodied as the first component has a shutoff element, which is designed to interact with the gas inlet of the housing of the air-guiding component in such a way that an effective flow cross section of a fluidic connection implementable via the gas inlet between the pipe system and the housing interior is at least partially reduced if, instead of the second component, the adapter part embodied as the first component covers and in particular closes the housing opening of the air-guiding component.

Furthermore, alternatively or additionally thereto, it is conceivable if the adapter part embodied as the first component has a shutoff element, which is designed to interact with the gas outlet of the housing of the air-guiding component in such a way that an effective flow cross section of a fluidic connection implementable via the gas outlet between the housing interior of the air-guiding component and the pipe system is at least reduced if, instead of the second component, the adapter part embodied as the first component covers and in particular closes the housing opening.

The adapter part can be adaptable with respect to the dimensions to greatly varying air-guiding components or can be stocked in various sizes and/or dimensions to enhance the usage options of the adapter part for already installed air-guiding components of different dimensions.

The fitting of the adapter part can be, for example, a threaded fitting or also, for example, a conical quick-action coupling fitting having a shutoff slide for optionally opening and closing the fitting connection to the air-guiding component.

The maintenance/cleaning device associated with the kit comprises, for example, a partial vacuum source or overpressure source for cleaning the pipe system. A compressed air container or compressor, for example, comes into consideration as the overpressure source, and in the simplest variant a vacuum cleaner or, for example, also a vacuum pump can be provided as the partial vacuum source. Particularly simple and effective cleaning of the pipe system can be carried out using a vacuum cleaner, moreover, detached dirt particles are collected in a vacuum cleaner container and not discharged into the surroundings through openings of the pipe system as in the case of blowing out. The maintenance/ cleaning device associated with the kit according to the invention can moreover optionally have an auxiliary pipe system, hose system, or another line for connecting the maintenance/cleaning device to a fitting of the adapter part.

Finally, the invention also relates to a method for maintaining and/or cleaning a pipe system according to concurrent claim 10.

Accordingly, the invention thus also relates to a method for maintaining and/or cleaning a pipe system, an intake pipe system for gaseous media used in an aspirating fire-detection and/or air-monitoring system, wherein this pipe system has a filter component according to one of the above described embodiments, having a housing, a gas inlet, and a gas outlet, and wherein in a normal operating mode of the air guiding system and/or the fire-detection and/or air-monitoring system, the gas inlet and the gas outlet of the air-guiding component are fluidically connected or connectable to the pipe system, to form a flow path extending from the gas inlet to the gas outlet in the housing interior of the air-guiding component.

In the method according to the invention it is provided that the normal operating mode of the air-guiding component is transferable into a maintenance/cleaning operating mode, in which the housing interior of the air-guiding component is fluidically connected or connectable to a maintenance/cleaning device. In this maintenance/cleaning operating mode, air, in particular cleaning compressed air, can be supplied to the housing interior if needed. Alternatively thereto, however, it is also conceivable to suction air and also possible liquid and solid particles out of the housing interior in the maintenance/cleaning operating mode.

According to embodiments of the method according to the invention, it is provided that to transfer the normal operating mode of the air-guiding component into the maintenance/cleaning operating mode, the housing of the air-guiding component is opened, wherein subsequently the housing coupling is covered using an adapter part having a fitting and closed at least in regions, and wherein then the fitting of the adapter part is fluidically connected to the maintenance/cleaning device to inject air, in particular cleaning compressed air into the housing interior, or to suction air out of the housing interior if needed.

In this context, it is conceivable if a closure part is preferably associated with the fitting, to reduce an effective flow cross section of a fluidic connection implementable via the fitting between the housing interior and the maintenance/cleaning device if needed or optionally, or to disconnect a fluidic connection between the housing interior and the maintenance/cleaning device implementable via the fitting if needed or optionally.

Alternatively or additionally thereto, it is conceivable if preferably at least one shutoff element is associated with the gas inlet to reduce an effective flow cross section of a fluidic connection implementable via the gas inlet of the air-guiding component between the pipe system and the housing interior if needed or optionally, or to disconnect a fluidic connection implementable via the gas inlet of the air-guiding component between the pipe system and the housing interior if needed or optionally.

Furthermore, alternatively or additionally thereto, it can be provided that preferably at least one shutoff element is associated with the gas outlet of the air-guiding component to reduce an effective cross section of a fluidic connection implementable via the gas outlet of the air-guiding component between the housing interior of the air-guiding component and the pipe interior if needed or optionally, or to disconnect a fluidic connection implementable via the gas outlet between the housing interior of the air-guiding component and the pipe system if needed or optionally.

In other words, the invention also relates to a method for operating an intake system for active fire-detection and/or air-monitoring, having a normal operating mode corresponding to a fire-detection and/or air-monitoring mode and a maintenance/cleaning operating mode. In the normal operating mode, air samples are conducted to the detection unit via the pipe system and studied therein for fire characteristic variables, air quality variables, or the air composition. In this mode, the air-guiding component fulfills its original function, for example, as a filter component. In the maintenance/cleaning operating mode, the air-guiding component is connected to a maintenance/cleaning device, for example, to an overpressure source for blowing out the pipe system, a partial vacuum source for suctioning out the pipe system, or to a test gas source for testing the function of the pipe and/or aspirating system or also the detection unit. After completion of the maintenance work, the air-guiding component is disconnected again from the maintenance/cleaning device. The connection of the air-guiding component to the maintenance/cleaning device can be established with the aid of a fitting permanently arranged on the air-guiding component or with the aid of an adapter part having a fitting.

Depending on the type of the maintenance work, the maintenance/cleaning operating mode comprises further method steps, for example, in the case of cleaning, the disconnection of the detection unit from the pipe system for protection from damage. If necessary, in further method steps parts of the air-guiding component can be removed, for example, a filter can be removed of the air-guiding component to be able to permit a cleaning airflow to flow unobstructed through the air-guiding component and the pipe system.

Accordingly, it can be stated in summary that it becomes possible by way of the invention to use components located in any case in a pipe system, in particular in a pipe system of an intake system for active fire-detection and/or air-monitoring, as a connection to the pipe system for carrying out maintenance work, so that additional valves, ball valves, etc. may be saved. The installation work and installation costs are thus reduced, moreover, maintenance work can be carried out faster.

DESCRIPTION OF THE SEVERAL VIEWS OF THE DRAWINGS

Exemplary embodiments of the invention are explained hereafter on the basis of drawings. In the figures of the drawings.

DETAILED DESCRIPTION

Figure 1:
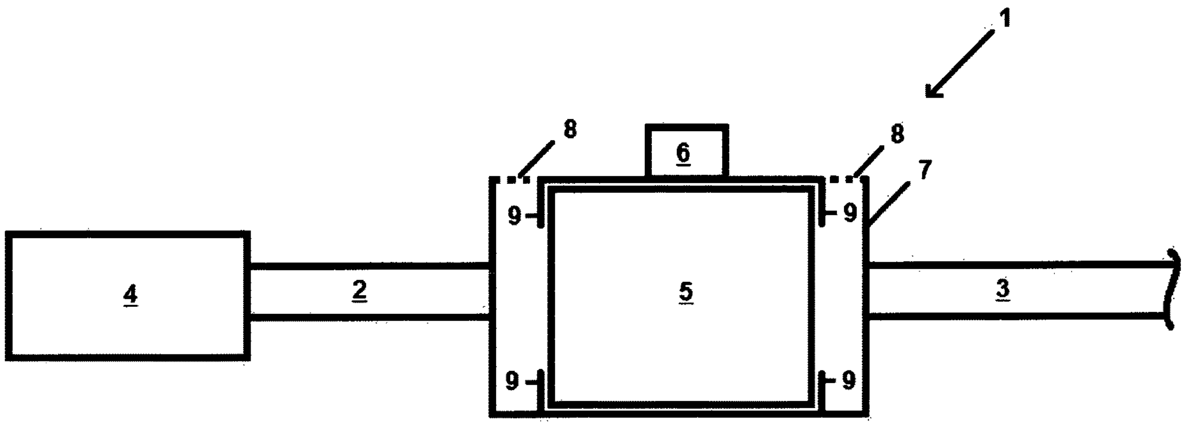
FIG. 1 schematically shows a first exemplary embodiment of an air-guiding component according to the invention with an adjoining pipe system.

The structure and the functionality of the air-guiding component 1 and the first component 10 embodied as an adapter part will be described in greater detail hereafter and with reference to the illustrations in FIG. 1 to FIG. 9.

Briefly summarized, the air-guiding component 1 comprises a housing 7 having a gas inlet 12*a* and a gas outlet 12*b*, wherein the gas inlet 12*a* and the gas outlet 12*b* are fluidically connected or connectable to a pipe system associated with the air-guiding component 1 and consisting in the figures of pipes 2, 3, to thus form a flow path extending in the housing interior from the gas inlet 12*a* to the gas outlet 12*b*.

In addition, a connecting region is associated with the air-guiding component 1, to fluidically connect the housing interior of the air-guiding component 1 to a maintenance/cleaning device 22 if needed or optionally.

In this case, it suggests itself that the connecting region has a fitting 6 provided in or on a wall region 11 of the housing 7 of the air-guiding component 1, via which the housing interior is fluidically connectable to the maintenance/cleaning device 22 if needed or optionally.

In this context, it is conceivable that the wall region 11, in or on which the fitting 6 is provided, is embodied as an integral component of the housing 7 and is fixedly connected thereto.

According to one alternative thereto, however, it is provided that the wall region 11, in or on which the fitting 6 is provided, is embodied as a wall region 11 of a first component 10, which is embodied as an adapter part and is detachably connected or connectable to the housing 7 via a connecting means 15 preferably embodied as a quick-action closure. As described in greater detail hereafter with reference to FIG. 6 to FIG. 9 in particular, the wall region 11 of the first component 10 can be designed to close a housing opening provided in the housing 7.

In detail, FIG. 1 shows a first exemplary embodiment of the air-guiding component 1 according to the invention, which is fluidically connected on two sides to one pipe 2, 3 in each case of a pipe system, for example, a pipe system of an aspirating system for active fire-detection and/or air-monitoring. An airflow is guided through the pipe 3, the air-guiding component 1, and the pipe 2 from a room to be monitored (not shown) to a detection unit 4, for example, with the aid of an aspirating unit (not shown). The aspirated airflow is studied in the detection unit 4 for fire characteristic variables, for example, smoke particles or fire gases, air quality variables, or the air composition.

The air-guiding component 1 is embodied in this and the following exemplary embodiments as a filter component. The air-guiding component 1 contains a filter insert 5 for prefiltering coarse dirt particles out of the airflow. To carry out maintenance work on the pipe system, for example, to clean the pipe system or to introduce a test gas for testing the function of the pipe or aspirating system or the detection unit 4, the housing 7 of the air-guiding component 1 in FIG. 1 has an integral fitting 6 connected fixedly to the housing 7. Via the fitting 6, the air-guiding component 1 can be connected to a maintenance/cleaning device 22, for example, shown in FIG. 9, such as an overpressure source or partial vacuum source or a test gas source, so that a fluidic connection exists between the maintenance/cleaning device 22 and the pipe system.

The housing 7 of the air-guiding component 1 has, for example, openings 8 closable using a cover (not shown) for optionally introducing shutoff elements, to be able to interrupt the fluidic connection of the air-guiding component 1 to the pipe 2 or pipe 3 or both pipes 2, 3 during the maintenance/cleaning work. The shutoff elements are, for example, simple shutoff plates, which are possibly provided with a peripheral seal and can thus effectuate a simple but reliable disconnection of the connection to the adjoining pipe 2, 3. Guides 9 are provided for inserting and holding the shutoff elements.

Figure 2:
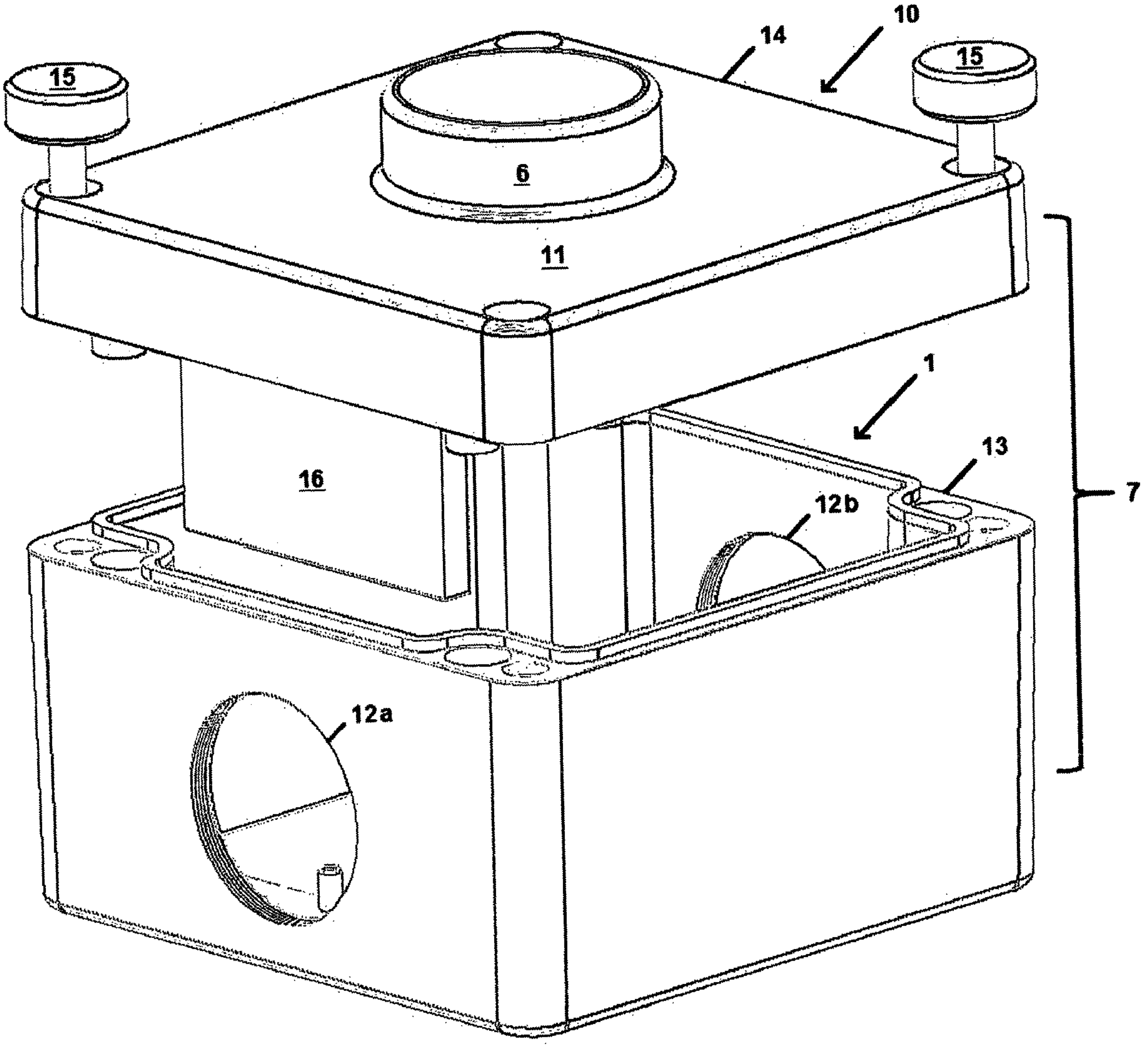
FIG. 2 schematically shows an isometric view of a second exemplary embodiment of the air-guiding component according to the invention with a first component embodied as an adapter part.

FIG. 2 shows a second exemplary embodiment of the air-guiding component 1 according to the invention having a first component 10 embodied as the adapter part, which is embodied in this exemplary embodiment as a detachable housing cover for an air-guiding component 1. The air-guiding component 1 comprises a housing 7, which consists of the components main housing 13 and cover housing 14, which are detachable from one another. The main housing 13 comprises a gas inlet 12*a* and a gas outlet 12*b* for the connection to pipes 2, 3 of a pipe system, for example, of an aspirating system for active fire-detection and/or air-monitoring. The air-guiding component 1 can additionally contain, for example, a filter insert 5 shown in FIG. 1. The first component 10 embodied as the adapter part comprises the cover housing 14, a fitting 6, connecting means 15, and a fixedly connected shutoff element 16. The cover housing 14 is designed matching with the main housing 13 of the air-guiding component 1 and closes it upon connection of the main housing 13 to the cover housing 14. The fitting 6 is provided with a feedthrough in the cover housing 14 and, for example, with a thread for connecting the fitting 6 to a maintenance/cleaning device 22 or to a line 23 (shown in FIG. 9) leading to such a maintenance/cleaning device 22. The connecting means 15 are used for the detachable connection of the cover housing 14 to the main housing 13 of the air-guiding component 1 and are embodied in this figure as screws. The shutoff element 16 is a shutoff plate fixedly connected to the cover housing 14, which blocks the fluidic connection of the air-guiding component 1 to an adjoining pipe. Depending on the orientation in which the cover housing 14 is connected to the main housing 13, optionally the gas inlet 12*a* or the gas outlet 12*b* is closable using the shutoff element 16. Thus, for example, during a cleaning procedure, the fluidic connection to a mechanically sensitive detection unit 4 can be interrupted during the cleaning to protect the detection unit 4 from damage.

Figure 3:
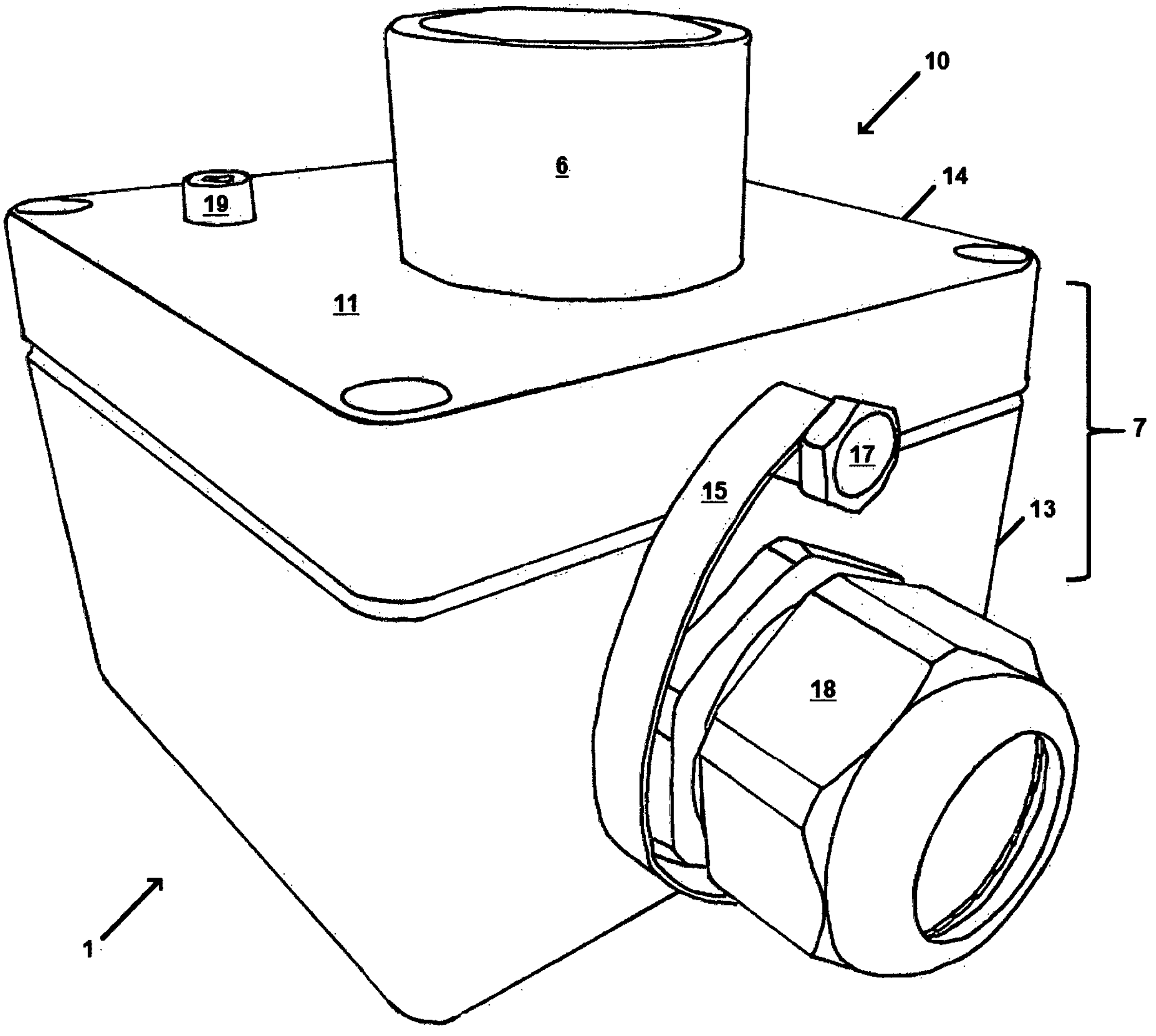
FIGS. 3 to 5 each schematically show an isometric view of the second exemplary embodiment of the air-guiding component according to the invention with a first component embodied as an adapter part and a quick-action closure.
Figure 4:
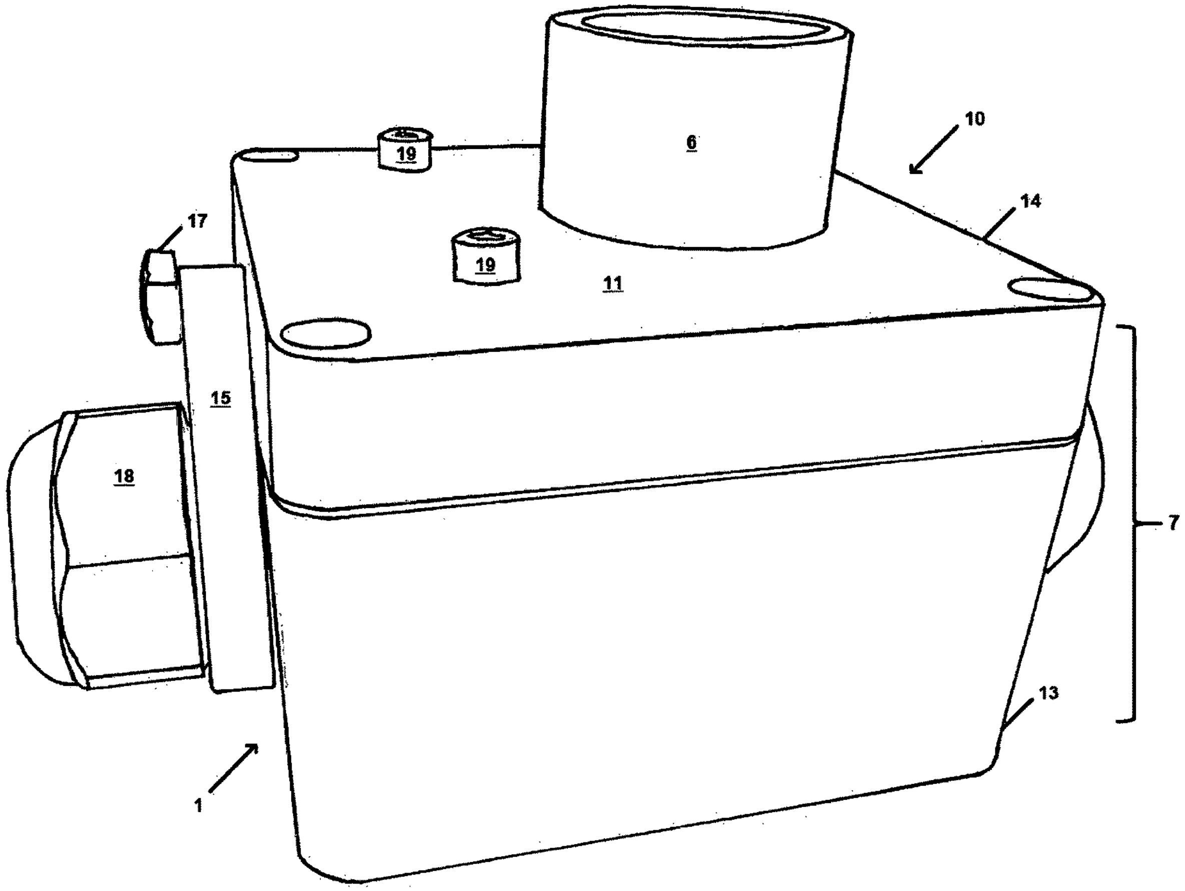
Figure 5:
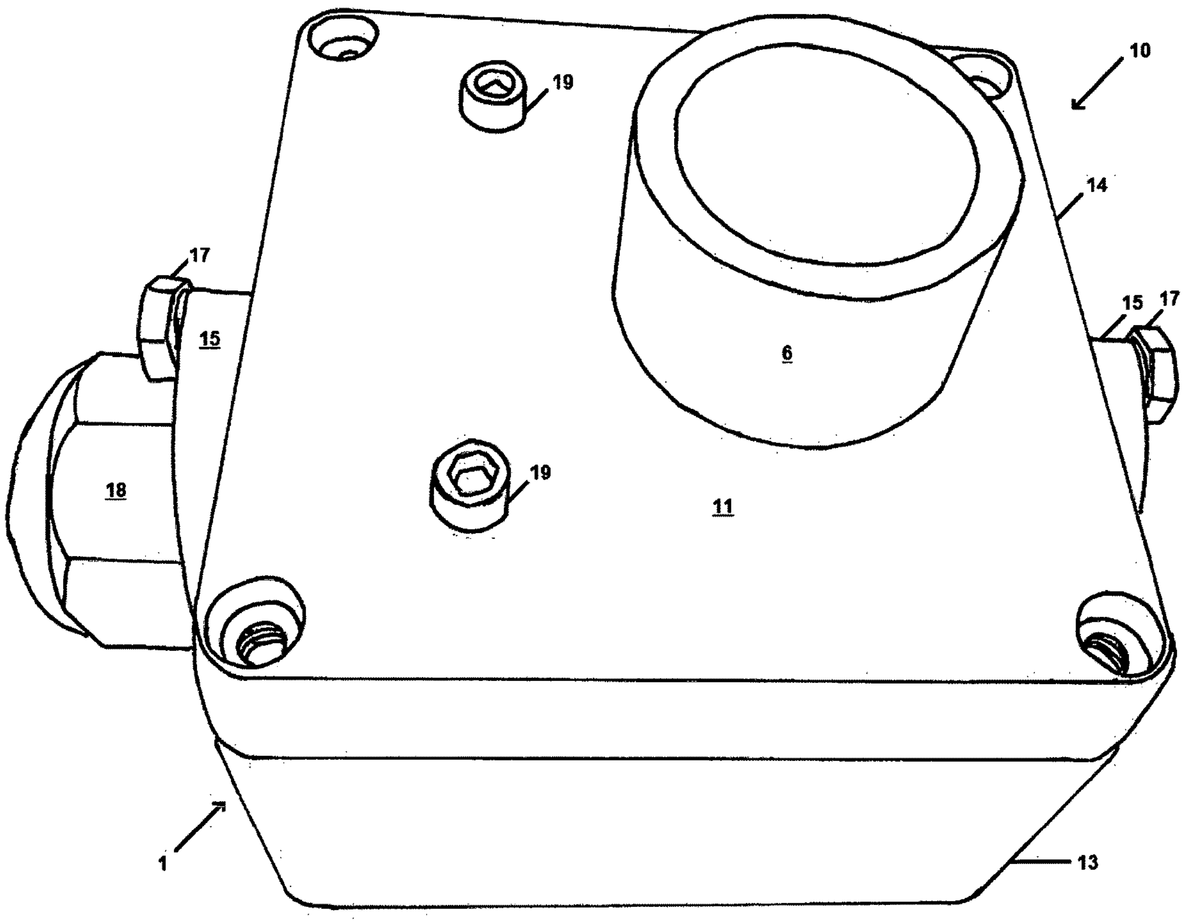

FIGS. 3 to 5 show the second exemplary embodiment of the air-guiding component 2 according to the invention having a first component 10 embodied as an adapter part and connecting means 15 embodied here as a quick-action closure, which, in contrast to the variants shown in FIG. 2, enable a faster connection of the cover housing 14 of the first component 10 embodied as an adapter part to the main housing 13 of the air-guiding component 1. For this purpose, instead of the screw connection shown in FIG. 2, a clamp connection is used between cover housing 14 and main housing 13. The clamp connection is produced here using connecting means 15 embodied as spring clips, which are each clamped between a projection of the cover housing 14 and a projection of the main housing 13. In the exemplary embodiment shown, a protruding screw 17 is used as the projection of the cover housing 14 and a pipe fitting 18 is used as the projection of the main housing 13. A detachable and nonetheless reliable connection of the first component 10 to the air-guiding component 1 can be implemented in a very short time by the clamping. Connecting means 19, in this case screws, which fix a shutoff element 16 (visible in FIGS. 6 and 7) fastened on the first component 10, are also visible in FIGS. 3 to 5.

Figure 6:
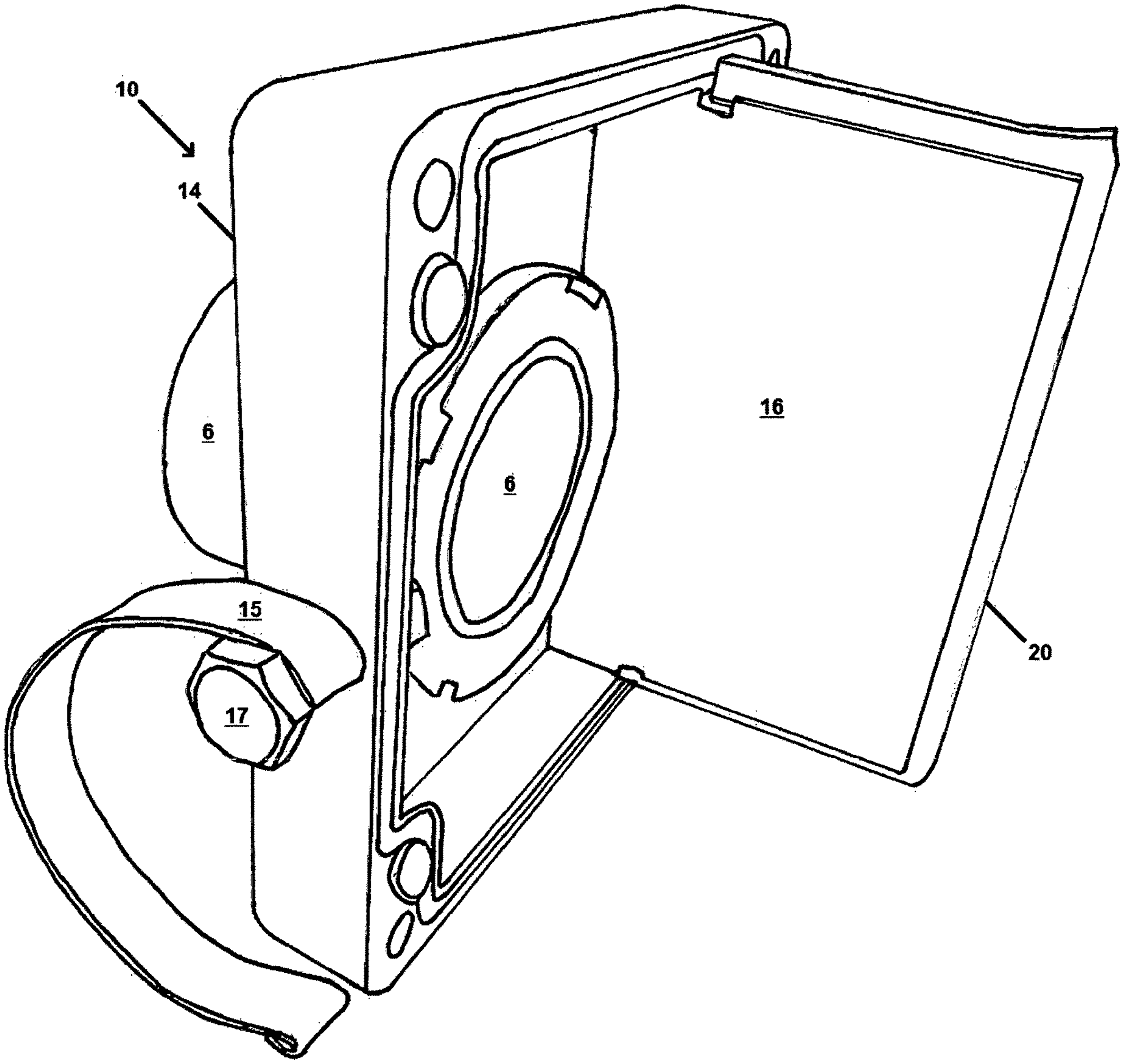
FIGS. 6 and 7 each schematically show an isometric view of a first component embodied as an adapter part without air-guiding component.
Figure 7:
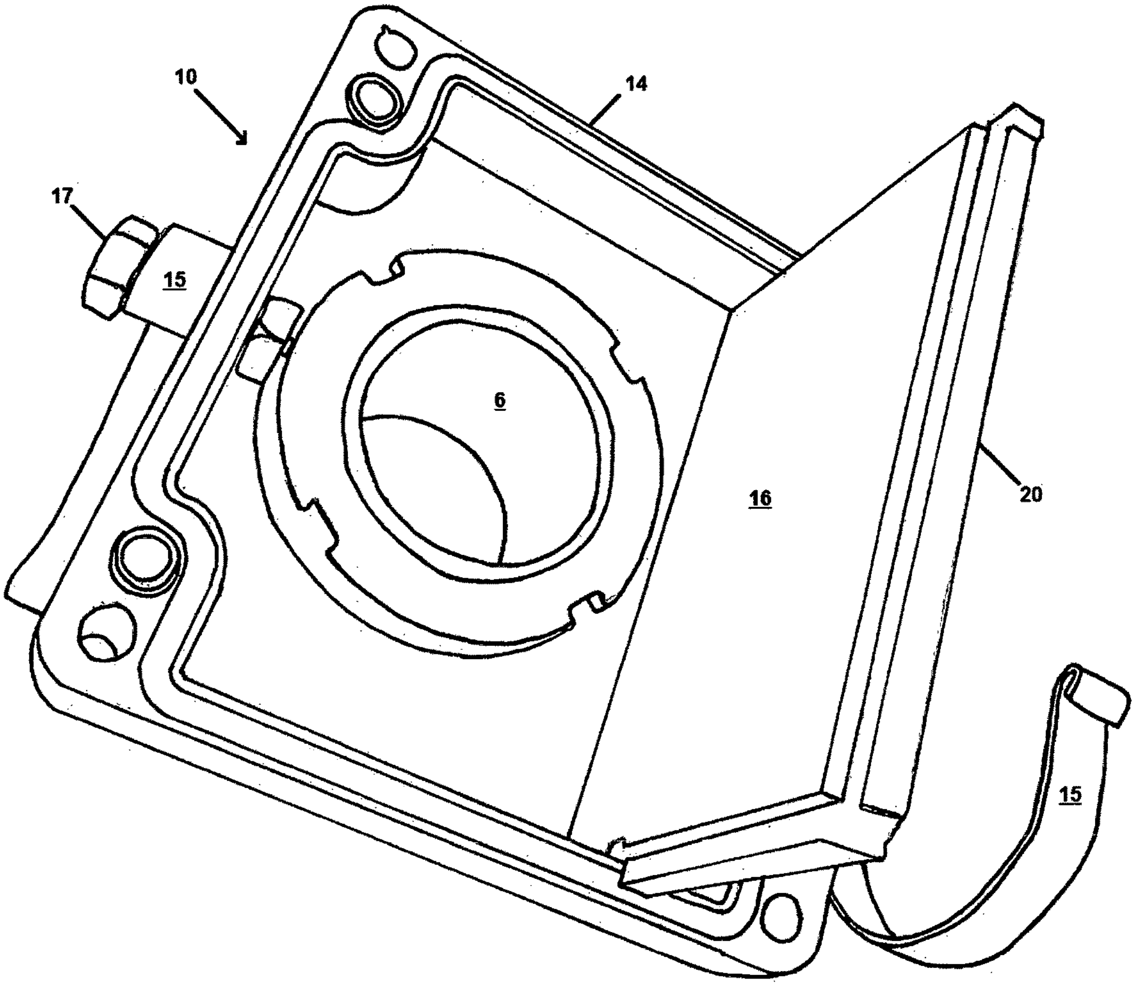

FIGS. 6 and 7 show the first component 10 embodied as an adapter part with a quick-action closure embodied as spring clips in the case of detached connection to the air-guiding component 1. In these views, in addition the shutoff element 16 fixedly connected to the first component 10 and having a peripheral seal 20 is visible, which ensures a reliable and sealed closure of the air-guiding component 1 in relation to an adjoining pipe connection.

Figure 8:
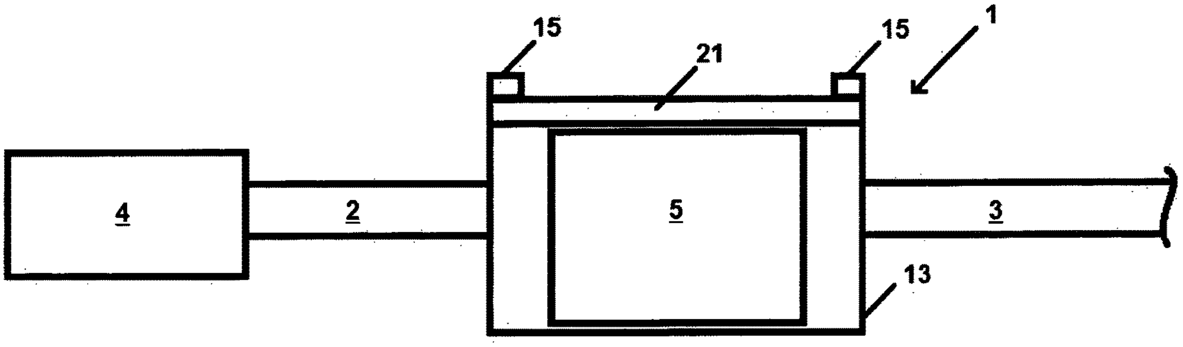
FIG. 8 schematically shows the second exemplary embodiment of the air-guiding component according to the invention in a normal operating mode.
Figure 9:
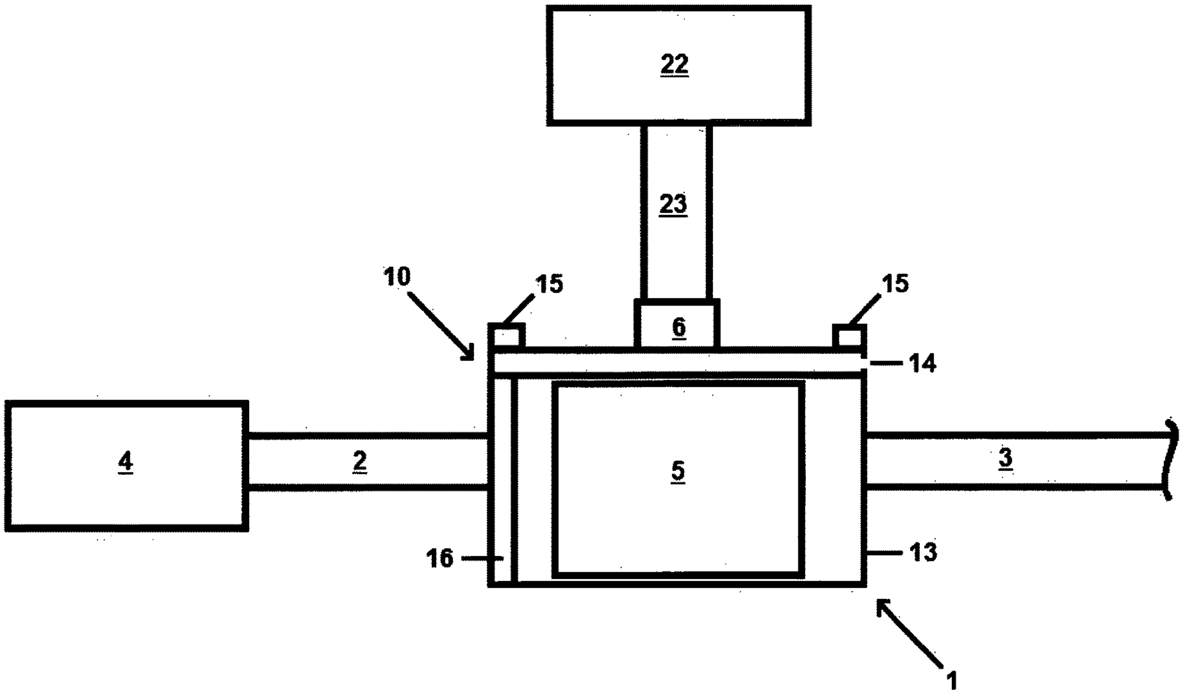
FIG. 9 schematically shows the second exemplary embodiment of the air-guiding component according to the invention in a maintenance/cleaning operating mode.
Figure 10:
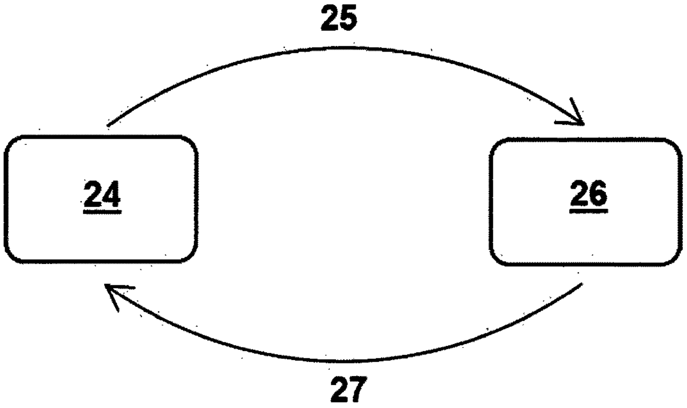
FIG. 10 shows a state diagram of the method according to the invention for maintaining and/or cleaning a pipe system.
Figure 12:
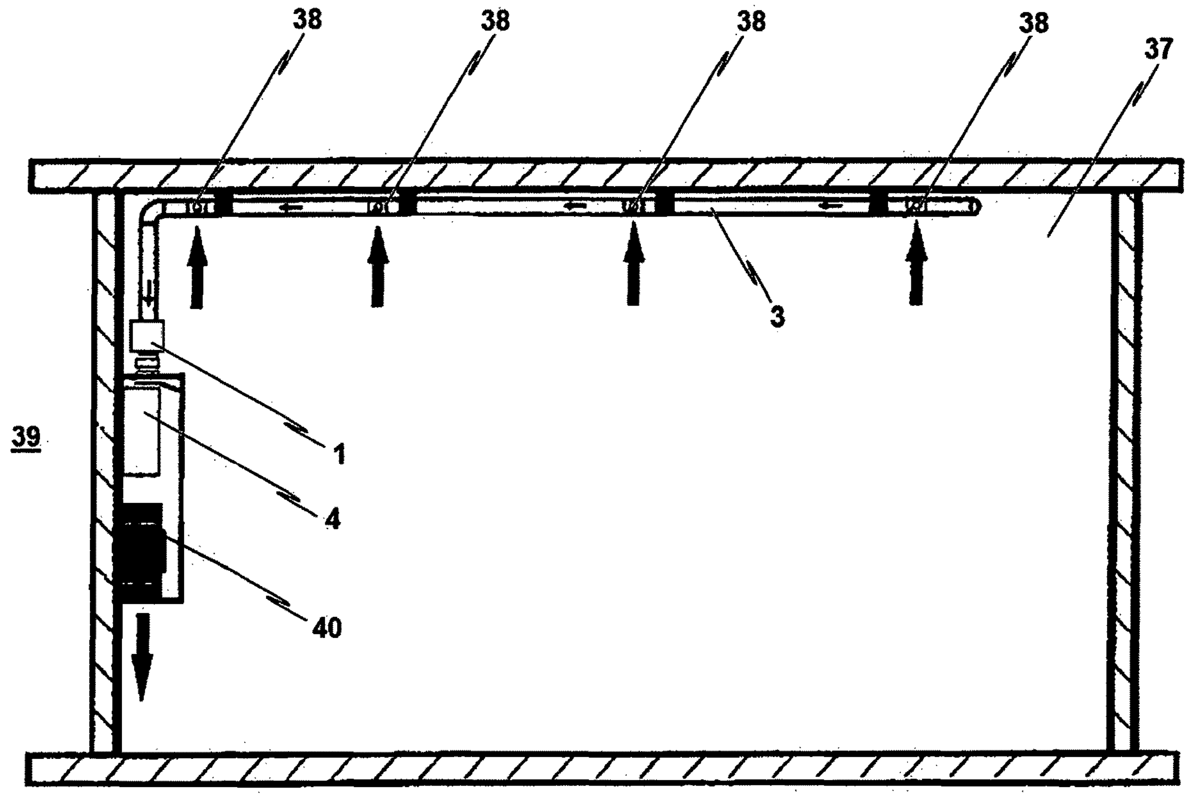
FIG. 12 schematically shows an exemplary embodiment of an aspirating fire-detection and/or air-monitoring system with a pipe system and an exemplary embodiment of the air-guiding component according to the invention.

FIGS. 8 and 9 are used for understanding the method according to the invention for operating a fire-detection and/or air-monitoring system 39 shown in FIG. 12 in a normal operating mode 24 shown in FIG. 10 and in a maintenance/cleaning operating mode 26.

FIG. 8 shows the fire-detection and/or air-monitoring system 39 in a normal operating mode 24 for fire-detection and/or air-monitoring. Via pipes 2, 3, an airflow is suctioned out of a room to be monitored and supplied to a detection unit 4 for studying the airflow for fire characteristic variables or air quality variables and/or the air composition. The airflow also flows through an air-guiding component 1 arranged between the pipes 2, 3. In this example, the air-guiding component 1 is a filter component having a filter insert 5 for prefiltering coarse dirt particles out of the airflow. The housing 7 of the air-guiding component 1 comprises a main housing 13 and a second component 21, embodied as a housing cover, without fitting, which are connected to one another by means of detachable connecting means 15, for example, screws.

FIG. 9 shows the fire-detection and/or air-monitoring system 39 in a maintenance/cleaning operating mode 26. In the maintenance/cleaning operating mode 26, the air-guiding component 1 is connected to a first component 10 embodied as an adapter part, by the second component 21 shown in FIG. 8, which is embodied as a housing cover, having been removed from the air-guiding component 1 and instead the cover housing 14 of the first component 10 having been detachably connected by means of the connecting means 15 to the main housing 13 of the air-guiding component 1. The first component 10 has a fitting 6, by which the air-guiding component 1 and the attached pipe 3 are fluidically connected via a line 23 to a maintenance/cleaning device 22, for example, a vacuum cleaner. However, the connection of the air-guiding component 1 to the pipe 2, which is connected to the detection unit 4, is blocked by the shutoff element 16 fixedly connected to the first component 10. The detection unit 4 is thus protected during the maintenance of the pipe system from damage due to, for example, strong partial vacuum or overpressure occurring during cleaning.

FIG. 10 shows the method according to the invention as a state diagram. The normal operating mode 24 is an operating state of the fire-detection and/or air-monitoring system 39 in which it suctions an airflow out of a room to be monitored and monitors the airflow for fire characteristic variables, air quality variables, or the air composition with the aid of a detection unit 4.

In the maintenance/cleaning operating mode 26, the fire-detection and/or air-monitoring system 39 is in a maintenance state, in which it is cleaned in particular, wherein, for example, the fluidic connection to the detection unit 4 is interrupted.

The transition 25 from the normal operating mode 24 to the maintenance/cleaning operating mode 26 is primarily characterized by the establishment of a fluidic connection between a maintenance/cleaning device 22 and a fitting 6 on an air-guiding component 1 of the fire-detection and/or air-monitoring system 39 or between a maintenance/cleaning device 22, a first component 10, embodied as an adapter part, having a fitting 6, and an air-guiding component 1 of the fire-detection and/or air-monitoring system 39. For example, during the transition 25, a second component 21 of the air-guiding component 1 embodied as a housing cover is detached and the first component 10 embodied as an adapter part is connected as a cover to a main housing 13 of the air-guiding component 1.

The transition 27 from the maintenance/cleaning operating mode 26 to the normal operating mode 24 is primarily characterized by the disconnection of a fluidic connection between a maintenance/cleaning device 22 and a fitting 6 on an air-guiding component 1 of the fire-detection and/or air-monitoring system 39 or between a maintenance/cleaning device 22, a first component 10, embodied as an adapter part, having a fitting 6, and an air-guiding component 1 of the fire-detection and/or air-monitoring system 39. For example, during the transition 27, the first component 10 is detached as a cover and a second component 21, embodied as a housing cover, of the air-guiding component 1 is connected to a main housing 13 of the air-guiding component 1.

Figure 11:
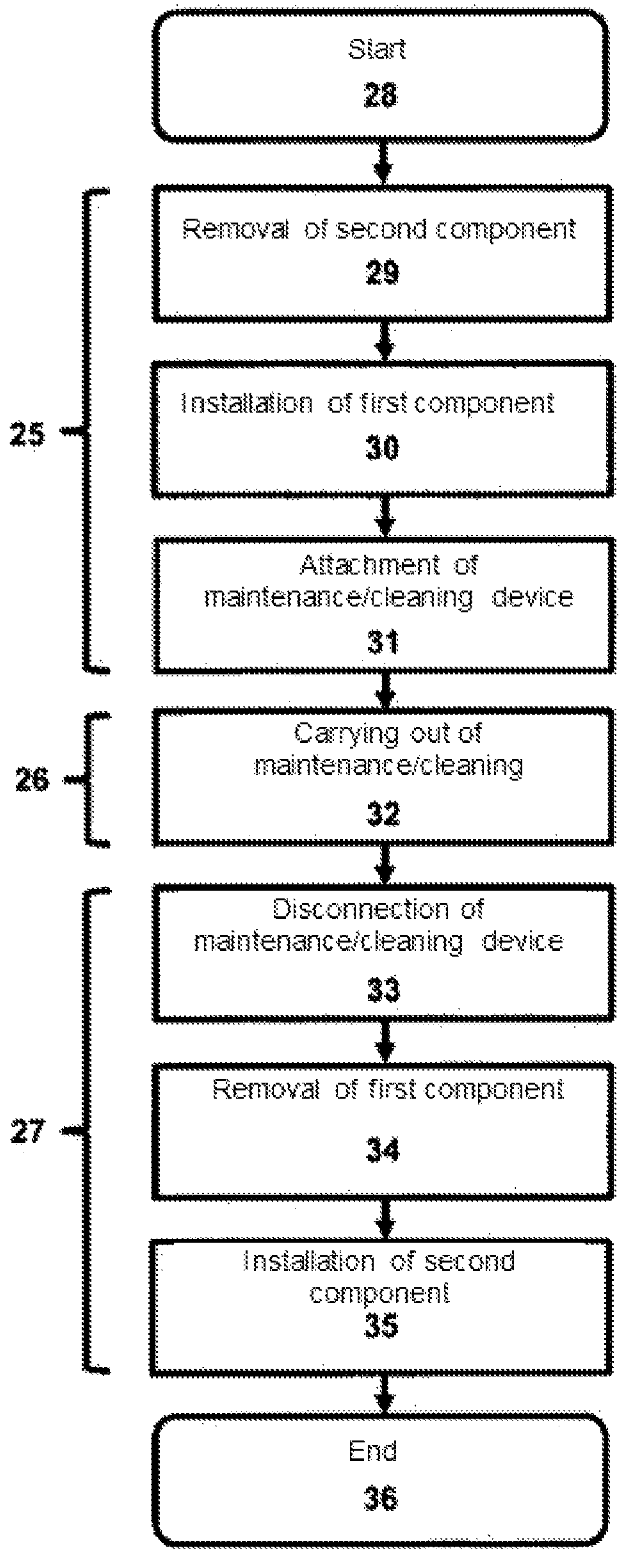
FIG. 11 shows a flow chart of a method according to the invention for maintaining and/or cleaning a pipe system.

FIG. 11 shows an exemplary flow chart for carrying out the method according to the invention for maintaining and/or cleaning a pipe system, in particular an aspirating fire-detection and/or air-monitoring system 39. The individual steps of the method are described hereafter.

During the start 28, the method for maintaining and/or cleaning the pipe system is started, for example, because of the passage of a maintenance interval, because of a fault message of the airflow monitoring of the fire-detection and/or air-monitoring system 39, or, for example, after startup to test the fire-detection and/or air-monitoring system 39 using a test gas. In general, before the start 28 of the method, the air-guiding component 1 and/or the fire-detection and/or air-monitoring system 39 is already in a normal operating state 24, in which it suctions an airflow out of a room to be monitored and monitors the airflow for fire characteristic variables, air quality variables, and/or the air composition with the aid of a detection unit 4.

Steps 29, 30, and 31 are used to prepare step 32 for carrying out the maintenance/cleaning and accordingly the transition 25 of the air-guiding component 1 and/or the fire-detection and/or air-monitoring system 39 from a normal operating mode 24 into a maintenance/cleaning operating mode 26. In step 29, the housing 7 of the air-guiding component 1 is opened by a second component 29 embodied as a housing cover being detached from the main housing 13 of the air-guiding component 1 by detaching and/or removing the connecting means 15. In step 30, the housing 7 of the air-guiding component 1 is closed by placing a first component 10 embodied as an adapter part onto the main housing 13 of the air-guiding component 1 and fixing it by means of the connecting means 15. The gas inlet 12*a* of the air-guiding component is also reduced or closed by a shutoff element 16 fixedly connected to the first component 10 embodied as an adapter part, for example, to fluidically disconnect a detection unit 4 connected via a pipe 2 to the air-guiding component 1 from the housing interior of the air-guiding component 1. In step 31, a maintenance/cleaning device 22, for example, a compressed air source, a vacuum cleaner, or a test gas source, is fluidically connected via a line 23 to the fitting 6 of the first component 10 embodied as an adapter part and thus to the housing interior of the air-guiding component 1.

In step 32, the maintenance and/or cleaning is carried out, for example, by the housing interior of the air-guiding component 1 and the attached pipe 3 or pipe system being blown out with the aid of the maintenance/cleaning device 22 embodied as a compressed air source, or by the housing interior of the air-guiding component 1 and the attached pipe 3 or pipe system being suctioned out, for example, with the aid of the maintenance/cleaning device 22 embodied as a vacuum cleaner, or, for example, by the fire-detection and/or air-monitoring system 39 being tested with the aid of the maintenance/cleaning device 22 embodied as a test gas source. In step 32, the air-guiding component 1 and/or the fire-detection and/or air-monitoring system 39 is in a maintenance/cleaning mode 26 in which, for example, parts of the pipe system are fluidically disconnected from the air-guiding component 1 with the aid of one or more shutoff elements 16 and the air-guiding component 1 is connected via a fitting 6 to the maintenance/cleaning device 22. Step 32 is ended when the maintenance and/or cleaning of the pipe system and/or the air-guiding component 1 is completely finished.

Steps 33, 34, and 35 correspond to the transition 27 of the air-guiding component 1 and/or the fire-detection and/or air-monitoring system 39 from a maintenance/cleaning operating mode 26 into a normal operating mode 24. In step 33, the maintenance/cleaning device 22, for example, a compressed air source, a vacuum cleaner, or a test gas source, is disconnected from the fitting 6 of the first component 10 embodied as an adapter part and thus fluidically disconnected from the housing interior of the air-guiding component 1.

In step 34, the housing 7 of the air-guiding component 1 is opened by detaching the first component 10 embodied as an adapter part from the main housing 13 of the air-guiding component 1 by detaching and/or removing the connecting means 15. In step 35, the housing 7 of the air-guiding component 1 is closed by the second component 21 embodied as a housing cover being placed on the main housing 13 of the air-guiding component 1 and being fixed by means of the connecting means 15. Since the second component 21 does not have a shutoff element, in this step a flow path extending from the gas inlet 12*a* to the gas outlet 12*b* in the interior of the housing 7 is formed again, so that the pipe system attached to the air-guiding component 1 and the further components such as the detection unit 4 are now again fluidically connected to the air-guiding component 1. The air-guiding component 1 and/or the fire-detection and/or air-monitoring system 39 is thus again in the normal operating mode 24 at the end 36 of the method.

FIG. 12 shows a schematic illustration of a pipe system of an aspirating fire-detection and/or air-monitoring system 39, which is associated with a monitoring region 37. A single intake pipe 3 is shown here as representative of the pipe system. In the illustrated embodiment, the pipe 3 is attached by means of hose clamps, for example, below the ceiling of the monitoring region 37. Air is aspirated out of the monitoring region 37 through intake openings 38 in the pipe 3. For this purpose, an intake unit 40 is used, which is integrated into the fire-detection and/or air-monitoring system 39. The intake unit 40 and the pipe system are monitored via an airflow sensor.

After the aspirated air sample has passed the airflow sensor, it flows through a detection unit 4 embodied, for example, as a smoke sensor or oxygen sensor, into the aspirating detector. The smoke sensor studies the aspirated airflow for existing smoke particles, for example, using scattered light measurements. The oxygen sensor measures the oxygen concentration of the air sample, which represents a mean value of the oxygen concentration in the air of the monitoring region 37. The measured value is compared to threshold values in the fire-detection and/or air-monitoring system 39.

As schematically indicated in FIG. 12, at least one air-guiding component 1 according to the invention, which can be, for example, a filter component, is associated with the pipe system of the aspirating fire-detection and/or air-monitoring system 39.

List of reference numerals

| | |
|---|---|
| 1 | air-guiding component |
| 2 | pipe |
| 3 | pipe |
| 4 | detection unit |
| 5 | filter insert |
| 6 | fitting |
| 7 | housing |
| 8 | opening |
| 9 | guide |
| 10 | first component |
| 11 | wall region |
| 12a | gas inlet |
| 12b | gas outlet |
| 13 | main housing |
| 14 | cover housing |
| 15 | connecting means of first/second component |
| 16 | shutoff element |
| 17 | screw |
| 18 | pipefitting |
| 19 | connecting means of shutoff element |
| 20 | seal |
| 21 | second component |
| 22 | cleaning/maintenance device |
| 23 | line |
| 24 | normal operating mode |
| 25 | transition |
| 26 | maintenance/cleaning operating mode |
| 27 | transition |
| 28 | start |
| 29 | removal of second component |
| 30 | installation of first component |
| 31 | fitting of maintenance/cleaning device |
| 32 | carrying out maintenance/cleaning |
| 33 | disconnection of maintenance/cleaning device |
| 34 | removal of first component |
| 35 | installation of second component |
| 36 | end |
| 37 | monitoring region |
| 38 | intake opening |
| 39 | fire-detection/air-monitoring system |
| 40 | intake unit |

The invention claimed is:

1. A filtering air guide for an intake pipe system for gaseous media in an aspirating fire-detection or air-monitoring system (30), the air guide including a housing (7) having an interior and comprising:

(a) a main housing (13) forming a component part of the housing (7) and having an opening (8), a gas inlet (12*a*)

and a gas outlet (12*b*) and configured to receive a filter (5) interposed in a gas flow path between the gas inlet (12*a*) and the gas outlet (12*b*); and (b) a first component (10) forming a replaceable housing cover (14) that is an adapter part detachably connectable to the main housing (13) and closing the opening of the main housing (13) when the first component is detachably connected to the main housing, the first component (10) having (i) a fitting (6) with an opening into the housing interior through a wall region (11) of the housing cover (14), the fitting being connectable to a maintenance/cleaning device (22), and (ii) at least one shutoff element (16) projecting from the first component and positioned to register with the gas inlet (12*a*) or the gas outlet (12*b*) and reduce the effective cross section of the gas flow path when the first component is detachably connected to the main housing.

2. A filtering air guide in accordance with claim 1 wherein the at least one shutoff element (16) is formed as a plate projecting from the first component.

3. A filtering air guide in accordance with claim 2 wherein the first component (10) has two shutoff elements formed as plates both projecting from the first component, one plate positioned to register with the gas inlet (12*a*) and reduce the effective cross section of the gas flow path through the gas inlet (12*a*) when the first component is detachably connected to the main housing and the other plate positioned to register with the gas outlet (12*b*) and reduce the effective cross section of the gas flow path through the gas outlet (12*b*) when the first component is detachably connected to the main housing.

4. A filtering air guide in accordance with claim 1 and further comprising a second component (21) forming an alternative, replaceable housing cover (14) detachably connectable to the main housing (13) and closing the opening of the main housing (13) when the second component is detachably connected to the main housing, the second component (10) having a wall region without a fitting and forming a continuously closed housing cover.

5. A kit for cleaning or maintaining a filtering air guide for an intake pipe system for gaseous media in an aspirating fire-detection or air-monitoring system (30), the air guide including a housing (7) having an interior and the kit comprising:

(a) a maintenance/cleaning device (22) comprising a partial vacuum source or overpressure source, (b) a main housing (13) forming a component part of the housing (7) and having an opening (8), a gas inlet (12*a*) and a gas outlet (12*b*) and configured to receive a filter (5) interposed in a gas flow path between the gas inlet (12*a*) and the gas outlet (12*b*); and (c) a first component (10) forming a replaceable housing cover (14) that is an adapter part detachably connectable to the main housing (13) and closing the opening of the main housing (13) when the first component is detachably connected to the main housing, the first component (10) having (i) a fitting (6) with an opening into the housing interior through a wall region (11) of the housing cover (14), the fitting being connectable to the maintenance/cleaning device (22), and (ii) at least one shutoff element (16) positioned to register with the gas inlet (12*a*) or the gas outlet (12*b*) and reduce the effective cross section of the gas flow path when the first component is detachably connected to the main housing.

6. A kit in accordance with claim 5 and further comprising a second component (21) forming an alternative, replaceable housing cover (14) detachably connectable to the main housing (13) and closing the opening of the main housing (13) when the second component is detachably connected to the main housing, the second component (10) having a wall region without a fitting and forming a continuously closed housing cover.

7. A kit in accordance with claim 5 wherein the maintenance/cleaning device (22) comprises a vacuum cleaner or vacuum pump as partial vacuum source or a compressed air container or a compressor as an overpressure source.

* * * * *